Jan. 3, 1956   J. LIEBERMANN   2,729,718
AUTOMATIC DEFROSTER CONTROL SWITCHING MECHANISM
Filed Jan. 16, 1952

INVENTOR.
JOHN LIEBERMANN
BY Hudson, Boughton,
Williams, David & Hoffmann
ATTORNEYS

United States Patent Office 2,729,718
Patented Jan. 3, 1956

2,729,718

AUTOMATIC DEFROSTER CONTROL SWITCHING MECHANISM

John Liebermann, Columbus, Ohio, assignors to Ranco, Inc., Columbus, Ohio, a corporation of Ohio Application January 16, 1952, Serial No. 266,725

9 Claims. (Cl. 200—136.3)

The present invention relates to an electric switching mechanism for automatically controlling defrosting of the cooling unit of a refrigerating apparatus.

This application is a continuation-in-part of my application Serial No. 211,017, filed February 15, 1951.

An object of the invention is to provide an electric switching mechanism for controlling the operation of a refrigerating apparatus to initiate a defrosting cycle at a predetermined time, such as 2 a. m. each day, and to terminate the defrosting cycle when the temperature of the cooling unit has reached a predetermined temperature or, should the temperature responsive element of the mechanism fail to function for one reason or another, to terminate the defrosting cycle after a period following initiation thereof.

A more specific object of the invention is to provide a switching mechanism of the character referred to having a pair of switch members which are actuated to one control position by a time keeping device and actuated to a second position by means including a thermal responsive element, or if the thermal responsive element fails to act within a predetermined time, to be actuated to the second control position by the time device.

A further object of the invention is the provision of a switching mechanism of the character referred to having means to accurately adjust the time lapse between the initial actuation of the switch members and the second actuation thereof by the time device, in the event of failure of the thermal element to act, for example.

Still another object of the invention is to provide a switching mechanism of the character referred to which is inexpensive to manufacture, accurate in operation and which will provide durable and trouble-free service.

Other objects and advantages of the invention will be apparent from the following description of the preferred form of the invention, reference being had to the accompanying drawing, wherein Fig. 1 is a schematic plan view of a switching mechanism embodying the invention and shown connected in the control circuit of an electrically motor driven compressor-condenser-expander type refrigerating system equipped with an electric heater for defrosting the evaporator thereof;

Figure 1:
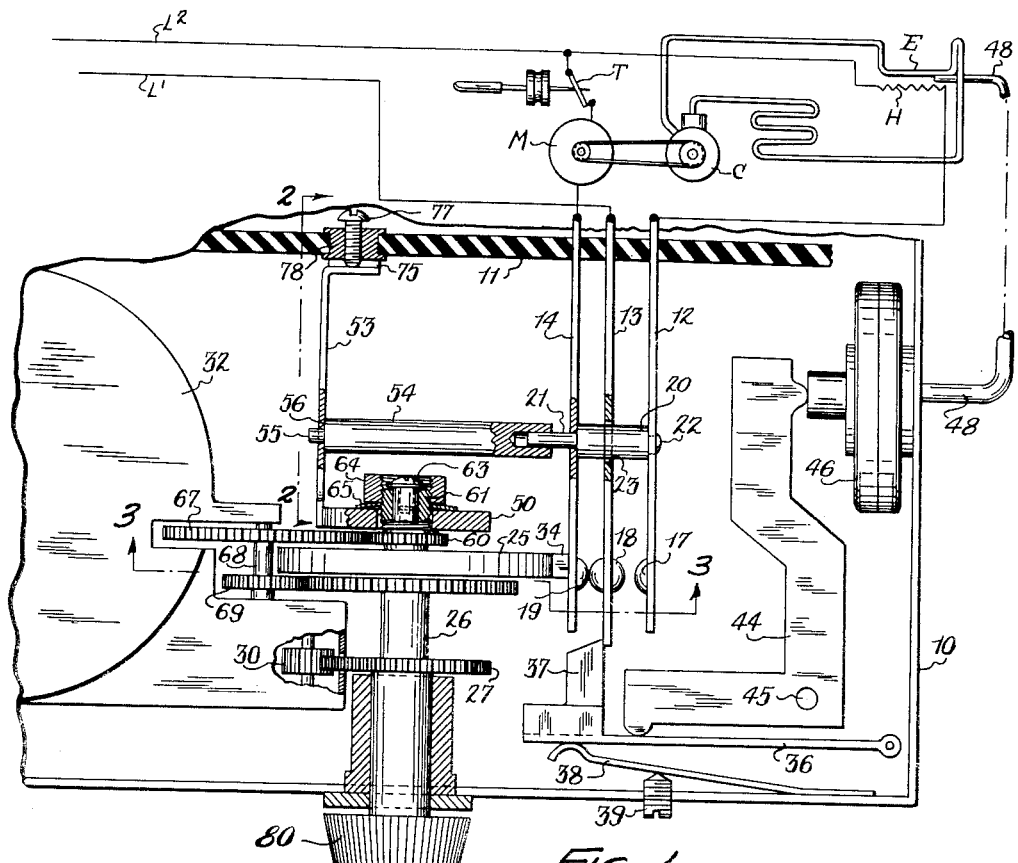

As mentioned previously, the invention is particularly adapted to a control mechanism for defrosting mechanical refrigerator evaporators and in one aspect thereof it contemplates the provision of at least two laterally deflectable blade type contact members which are normally biased in one direction with one of the members urged toward contact with the other to establish an electric circuit therethrough. A cam means, powered by a suitable timing device, is arranged to move the contact blades, while separated, against the bias thereof and to a position in which one of the blades is engaged with and held by a thermally responsive latching mechanism, after which the other blade is released by the cam means and caused to spring into contact with the latched blade. The engagement of the contact blades may close the circuit of an electric heater for heating the refrigerator evaporator to melt any frost which may have accumulated thereon, for example. In the preferred form of the invention, a third deflectable contact blade is interposed between the cam and the latchable blade and is normally engaged by the latter switch blade for maintaining the refrigerator motor circuit therethrough, and when the cam releases the other one of the first two mentioned contact blades to establish the circuit through the electric heater as described, the third mentioned contact blade is likewise released and moves with a snap action to a position to break the circuit therethrough to deenergize the compressor motor.

The thermal responsive latch is sensitive to the temperature of the evaporator and when this temperature rises to a predetermined degree above the melting point of ice, the latch is actuated to release the contact blades restrained thereby which return with a snap movement to their original relative separated positions to break the circuit through the electric heater, and in the case of the preferred embodiment, to re-establish the circuit for the refrigerator motor.

In the event that the thermal responsive element should become defective so that the latch would be inoperative to release the switch blade held thereby, the temperature of the evaporator would rise above that desired and cause spoilage of food in the refrigerator and possible damage to the refrigerator. To obviate this possibility, means driven by the time mechanism and independent of the thermal element is provided for separating the contact blades through which the heater circuit is established within a predetermined time following closure of the heater circuit.

The invention can be embodied in various forms of devices for controlling the operation of so called mechanical refrigerators, and for the purposes of illustration, I have shown a control switch mechanism for controlling defrosting of a refrigerating apparatus comprising a compressor driven by an electric motor M, a condenser C, and evaporator E all connected to form a refrigerating system as is well understood in the art. An electric heater H is disposed adjacent to the evaporator to melt the frost from the evaporator when the heater is energized.

The control switch mechanism is enclosed in a housing 10, which may be of any suitable construction and for the sake of simplicity the details thereof have not been shown. The housing includes an insulating block 11 which has three leaf springs or resilient blade type switch members 12, 13, 14 attached at one end thereto, which blades carry suitable contact members 17, 18 and 19, respectively. The blades are all normally biased to the left as viewed in Fig. 1 and the contacts thereof are in registration with one another.

The blades 12, 14 are spaced apart by a cylindrical member 20 which is formed of suitable insulating material and which has a pin 21 projecting from one end and extends through an opening in the blade 14. The other end of the member 20 is secured to the blade or lug by a rivet 22, and the central portion thereof extends freely through an opening 23 in the blade 13. The member 20 substantially interlocks blades 12 and 14 so that they swing as a unit while the blade 13 may move relative to the outer blades and engage contact 18 with contacts 17 or 19.

Power is supplied to the refrigerator motor M and heater H by two lines L1, L2 and blade 13 is connected with power line L1. Blade 12 is connected to one terminal of the heater H and the other terminal of the heater is connected with the other power line L2. Blade 14 is connected in series with the compressor motor M and a thermostatically operated switch T, which is a conventional thermal responsive switch for controlling normal refrigeration cycles of the refrigerating system.

The blade 14 is biased against the periphery of a cam 25 which is mounted on a rotatable shaft 26 suitably journaled in the housing 10. The shaft 26 has a gear wheel 27 thereon which is rotated by a pinion 30 of a time mechanism, such as a synchronous motor 32. The pinion 30 is driven by a gear train, not shown, at a rate to revolve the gear 27, and hence the cam 25, once each twenty-four hours. It will be understood that any suitable time mechanism could be employed and that the cam could be revolved at whatever speed desired.

Figures 3, 4:
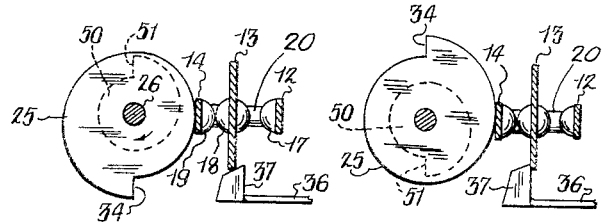
Figs. 3, 4, 5 and 6 are schematic illustrations of certain parts of the switching mechanism in different positions, certain parts thereof being shown as viewed in line 3—3 of Fig. 1.

The cam 25 has a gradual rise to a step 34 therein, and the cam is rotated clockwise so that with reference to Fig. 3, the blade 14 is gradually moved to the right by the cam and is then suddenly permitted to snap to the left by dropping from the step 34. As the blade 14 moves to the right as described, blade 13 lies thereagainst so that contacts 18, 19 are engaged while blades 12, 13 are separated by the member 20, and contacts 17, 18 are open. Under these conditions, the circuit for motor M is established through contacts 18, 19, and is subject to the control T, and the circuit of the heater is open at contacts 17, 18.

A thermal responsive latch mechanism is provided to latch the contact blade 13 when it is moved to the right by blade 14 and prior to blade 14 dropping from step 34 of the cam 25. This mechanism comprises an arm 36 pivoted at one end to the housing 10 and having a latch member 37 at the opposite end. The arm 36 is normally urged upwardly by a leaf spring 38, the tension of which is adjustable by a set screw 39 threaded through an opening in the side of the housing. The latch member 37 has an inclined surface arranged to be engaged by the blade 13 so that the blade first depresses the latch member and arm 36 as it moves to the right and then as the blade passes the inclined surface, the latch is released and moves behind the blade to hold it from movement to the left. This action is illustrated in Figs. 3 and 4.

The latch member 37 is depressed to release blade 13 by a bell crank lever 44 pivoted in the housing on a pin 45. One of the arms of the lever 44 engages the arm 36 and the opposite end of the lever is engaged by an expansible wafer type thermal responsive element 46 which is arranged to expand and move the lever 44 against the arm 36 and depress the latch member 37 to release the switch blade 13. The element 46 has a capillary tube 48 connected thereto, the outer end of which is closed and is in thermal contact with the evaporator E of the refrigerating system. The element 46 and its tube 48 are filled with a suitable thermal responsive fluid which upon increase of temperature of the evaporator causes the element 46 to expand and move the lever 44 counterclockwise against the tension set up by the spring 38. The latch 37 can be made to disengage with the switch blade 13 at any predetermined temperature of the evaporator by adjusting the tension of the spring 38 against the arm 36.

Figures 5, 6:
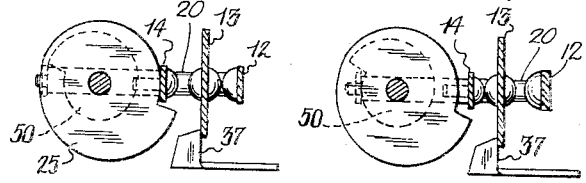

The operation of the switching mechanism thus far described is as follows: As the cam 25 rotates during the refrigerating cycles, switch blades 12, 13, 14 are moved to the right with contacts 18, 19 in engagement and contacts 17, 18 separated as shown in Fig. 3. Upon movement to the right a predetermined distance the blade 13 is latched in place by the latch member 37 after which blades 12, 14 drop to the left by reason of the cam step 34, which opens contacts 18, 19 to break the circuit of motor M and closes contact 17 on contact 18 to establish the circuit through heater H, as shown in Fig. 5. Normally the thermal responsive element, due to warming of the evaporator, should release the latch 37 within a relatively short period, causing contact blade 13 to snap to the left and separate contacts 17, 18 and reengage contacts 18, 19 and reestablish the compressor motor circuit. It will be observed that the member 20 prevents blade 12 from following blade 13.

If for some reason or other, element 46 fails to actuate the latch 37, the evaporator is apt to become overheated and cause food spoilage in the refrigerator and possible damage to the refrigerator. To obviate these occurrences, means is provided for separating contact blade 12 from blade 13 after a predetermined time following the closure of the contacts 17, 18. This means comprises a second cam 50 rotatably supported on the shaft 26, and driven at a rate proportional to and in excess of the rate at which cam 25 is driven, as is explained more fully hereinafter. The cam 50 is provided with a step 51, and a leaf spring 53 is anchored at one end to the housing and is normally biased to the right with its outer end in engagement with the periphery of the cam 50. The force of the spring 53 is such to overcome the combined forces of springs 12, 13, 14 to move the latter to the left, as explained more fully hereinafter. A cylindrical link 54 interconnects the leaf spring 53 and contact blade 14, which connection is effected by providing a bore in one end of the link to loosely receive the pin 21, and the link has one end reduced as at 55, which forms a shoulder 56, and the portion 55 extends through an opening in the spring so that the spring engages the shoulder 56. Thus, when the spring 53 drops from the cam step 51 it moves to the right with a snap action and moves the blades 12, 14 outwardly to reengage contacts 18 and 19 and separate contacts 17, 18, as may be seen in Fig. 6. The cam 50 is rotated in synchronism with cam 25 so that spring 53 drops from the step 51 a predetermined period after blade 14 drops from step 34 of cam 25 so that the heater for the evaporator cannot be energized for a period sufficiently to warm the refrigerator or to injure the refrigerating apparatus in the event the latch 37 should fail to operate for some reason. This period may be of any desired time, for example, twenty minutes and is preferably determined by the relative rates of rotation of the cams 25 and 50 and the position of the portion of the spring 53 engaging the cam 50. The degree of rise on the cam 25 adjacent to the base of the step 34 could be greater than that shown so that the cam would move the switch blades to effect refrigeration within several hours following a defrost operation and thereby prevent repeated defrost cycles at two hour intervals in the event of failure of the element 46.

As mentioned previously, the cam 50 is rotatably supported on the shaft 26, and in the form shown, the inner end of the shaft is of reduced diameter and rotatably supports a pinion 60 which has a hub 61 which is threaded at its outer end. The pinion is held on the shaft 26 by a screw 63 threaded in a bore in the end of the shaft and the cam 50 is supported on the hub thereof and is frictionally locked to one face of the pinion proper by a nut 64 threaded on the hub and operable to clamp a lock washer 65 to the cam, as shown and thereby fix the cam to the pinion. The construction shown permits the cam 50 to be set at any desired angular position relative to the pinion 60 by loosening nut 64, shifting the cam and retightening the nut.

Figure 2:
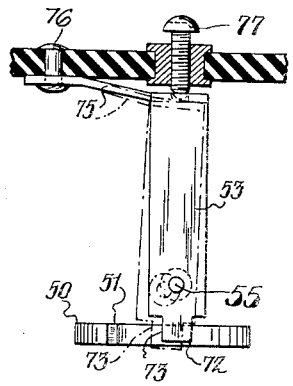
Fig. 2 is a sectional view taken on line 2—2 of Fig. 1.

The pinion 60 is driven by a gear 67 which is attached to a shaft 68 journaled in the frame of the synchronous motor 32, and which shaft is driven by a gear 69 driven in turn by a gear 70 attached to the shaft 26. The gear ratios between the cams may be any desired; for example, 12:1 so that cam 50 rotates once each two hours. The cam 50 is positioned angularly relative to the pinion 60 so that the step 51 thereof actuates the link 54 to open contacts 17, 18, if they are closed, after approximately the maximum time permissible for the duration of the defrosting cycle has elapsed following the actuation of cam 25 to close contacts 17, 18. Since the maximum permissible defrosting period is apt to be critical and the movement of the cam 50 is relatively slow, means is provided to swing the spring 53 relative to the cam 50 so that the edge thereof which is released by cam step 51 can be accurately located to cause release of the spring at a substantially precise moment. In the form shown, the spring 53 has a lug formation 72 on the lower end thereof which rides on the periphery of the cam 50 and the edge 73 thereof is released by the step 51 to actuate the link 54, as described. The other end of the spring 53 is attached to one end of a spring member 75, the other end of which is attached to the block 11 by a rivet 76, and the member is normally sprung upwardly but may be deflected downwardly to shift the lower end of the spring 53 laterally, as is illustrated in broken lines in Fig. 2. The deflection of member 75 is controlled by a screw 77 threaded in a sleeve 78 in the block 11. It will be apparent that by adjusting the screw 77, the position of the spring 53 can be accurately determined and the lug 72 of the spring can be shifted along the periphery of the cam, within limits, to accurately establish the instant that the edge 73 of the lug will drop from the step 51 of the cam 50.

Preferably, the shaft 26 can be rotated by a knob 80 attached to the outer end thereof to set the cams 25, to operate at a predetermined time of day. An overrunning clutch, not shown, is preferably provided in the gear train of the synchronous motor to permit rotation of the shaft 26 without corresponding rotation of the motor.

In the form of the invention shown, the evaporator is defrosted by an electric heater, but it is to be understood that any other suitable means for applying heat to the evaporator could be employed. For example, hot gas from the condenser could be directed through the evaporator by by-passing the gas around the expansion valve or its equivalent. In that event, the compressor motor would be operated during the defrost cycle and contact blade 14 could be eliminated, and blade 12 could have a projection riding directly on the periphery of the cam 25 and arranged to move blade 13 to its latched position. In this event the projection on blade 12 would preferably be of insulating material.

It will be seen that by my invention I have provided a relatively simple switching mechanism for controlling the application of heat to the cooling units of refrigerators and which has a safety feature of positively limiting the period of heat application to the evaporator.

Although I have described but one form of the invention, it is understood that other forms could be adapted, all falling within the scope of the appended claims.

Having thus described my invention, I claim:

1. In an electric switching mechanism, a pair of resilient members biased in one direction and one member adapted to be biased into engagement with the other, means to releasably hold the other of said members in one position, means including a pair of cams to hold said one member from said other member, one cam having a step operative to release said one member to engage said other member held in said one position and the other cam having a step operative to cause snap movement of said one member out of contact with said other member held in said one position, thermal responsive means to actuate said first mentioned means to release said one member, and means to drive each of said cams at a predetermined rate.

2. In an electric switching mechanism, a pair of resilient switch members biased in one direction and one member adapted to be biased into engagement with the other, a latch to hold the other of said members in one position and restrain its movement in said one direction, means including a cam to hold said one member from said other member and to release said one member to engage said other member when the cam is rotated to a predetermined position, means including a second cam having a step to cause snap movement of said one member from said other member when said second cam is rotated to a predetermined position, thermal responsive means to actuate said latch to release said other member and means to drive each of said cams at a predetermined rate.

3. In an electrical switching mechanism, a pair of spring contact blades normally urged in one direction and one adapted to engage the other, cam means for gradually moving said blades in spaced relation and in a direction opposite to said one direction and to release said blades for movement in said one direction, a latch to releasably restrain said other of said blades from movement in said one direction, said other blade being moved to engage with said latch during its movement in said opposite direction, a thermal responsive device for moving said latch to release said other blade, cam means to snap move said one blade in said opposite direction and from engagement with said other blade, and means to drive each of said cam means at a predetermined rate.

4. In an electrical switching mechanism, a pair of spring contact blades normally urged in one direction and one toward the other, means including a cam for gradually moving said blades in spaced relation and in a direction opposite to said one direction and to release said blades for movement in said one direction, a latch to releasably restrain said other of said blades from movement in said one direction, said other blade being moved to engage with said latch during its movement in said opposite direction, a thermal responsive device for moving said latch to release said other blade, a spring arm arranged to overcome said one blade to move the latter blade in said opposite direction, means including a cam to snap actuate said spring arm to move said one blade in said opposite direction subsequent to the release of said blades by the first mentioned means, and means to drive each of said cams at a predetermined rate.

5. In an electrical switching mechanism, three spring contact blades normally urged in one direction, and the outer blades being engageable with the intermediate blade, means interlocking the two outer blades for movement in unison, a cam engaged by one of said outer blades, said cam arranged to gradually move said one outer blade in a direction opposite to said one direction and to release said blade for movement in said one direction, a latch to releasably hold said intermediate blade from movement in said one direction in one position, said intermediate blade being moved by said one outer blade to engage said latch during its movement in said opposite direction and engaged by the other of said outer blades when said cam releases said one outer blade, a thermal responsive device for actuating said latch to release said intermediate blade for movement from said other outer blade to said one outer blade, cam means to snap move said other outer blade in said opposite direction, and means to drive said cam and cam means at predetermined rates.

6. In an electric switching mechanism, an electric switch device, an actuating mechanism for said switch including two rotating members, one of which rotates at a predetermined rate greater than the other rotating member, means to actuate said switching device to one position by one of said rotating members, and means to actuate said switching device to another position by the other of said rotating members.

7. In an electric switching mechanism, an electric switch, an actuating mechanism for said switch including two rotating members, one of which rotates at a predetermined rate greater than the other rotating member, means to actuate said switching device to one position by one of said rotating members, means to actuate said switching device to another position by the other of said rotating members, and means to adjust the angular position of one of said rotating members relative to the other.

8. In an electric switching mechanism, contact means, timer means including a first cyclically operating member for periodically actuating said contact means from a first to a second circuit controlling position and a second cyclically operating member for actuating said contacts from said second position to said first position, said operating members operating in synchronism and adapted to be relatively positionable to provide a pre-determined period between said operations thereof, and thermally responsive means to actuate said contact means from said second to said first position for normally actuating said contact means during said period.

9. In an electric switching mechanism, contact means, timer means including a first cyclically operating member for periodically actuating said contact means from circuit opening to circuit closing positions and a second cyclically operating member for actuating said contact means from said closed position to said open position, said operating members operating in synchronism and adapted to be relatively positionable to provide a pre-determined period between said operations thereof, and thermally responsive means to actuate said contact means from said closed to said open position for normally opening said contacts during said period.

References Cited in the file of this patent

UNITED STATES PATENTS

| | | |
|---|---|---|
| 1,517,042 | Anderson | Nov. 25, 1924 |
| 2,298,323 | Wheeler | Oct. 13, 1942 |
| 2,359,812 | Wallace | Oct. 10, 1944 |
| 2,364,256 | Kolff | Dec. 5, 1944 |
| 2,500,061 | Clark | Mar. 7, 1950 |
| 2,582,285 | Schellens | Jan. 15, 1952 |
| 2,599,171 | Freeman | June 3, 1952 |